Patented May 5, 1936

2,039,290

UNITED STATES PATENT OFFICE 2,039,290

PRODUCTION OF HIGHLY ACETYLATED CELLULOSE ACETATES

Ernst Berl, Pittsburgh, Pa.

No Drawing. Application May 24, 1934, Serial No. 727,279. In Great Britain June 23, 1933

5 Claims. (Cl. 260—101)

The present invention relates to the production of highly acetylated cellulose acetates.

Heretofore, I have provided the art with a process of acetylating cellulose which involves initially treating cellulose with glacial acetic acid containing a small amount of catalyst, for example, sulfuric acid. After the initial treatment, a large proportion of the acid is withdrawn. The treated cellulose is then acetylated at a low temperature, preferably about 0° C. with a mixture containing an excess of acetic anhydride and a large proportion of a substance (e. g. benzene) or several substances having the property of not dissolving the cellulose acetate but of swelling it whereby the final cellulose triacetate product is substantially free from catalyst. The foregoing process is more fully described and is claimed in my copending application, Serial No. 632,791, filed September 12th, 1932.

An object of the present invention is to provide an improved process involving the maintenance of the cellulose in a quiescent condition while subjecting the cellulose to the action of an acetylating liquid.

It is another object of the invention to provide a process of producing highly acetylated cellulose acetates in which the cellulose under treatment is held stationary and acetylating liquid is passed in contact therewith.

A further object of the invention is to provide a process of the character described in which the cellulose under treatment is held between foraminous surfaces and the treating liquid is caused to flow in intimate contact therewith.

It is also within the contemplation of the invention to improve the degree of acetylation and to produce tri-acetylated products having great stability and uniformity, an ability to retain their fibrous state, and a capacity to take up large quantities of softening agent without becoming jellified.

Other objects and advantages of the invention will become apparent from the following description of a preferred embodiment thereof.

I have discovered that improved results can be obtained by maintaining the cellulosic material under treatment in a stationary or quiescent state and passing the treating liquid continuously or intermittently through or in contact with the cellulosic material.

In carrying the invention into practice, it is preferred to pass or circulate the treating liquid for the first stage and the acetylating liquid for the second stage repeatedly through the quiescent cellulosic mass. Any suitable means may be employed for circulating the liquid such as a pump or the like. In this manner, I have found that it is possible to obtain a completely triacetylated product containing about 62% of combined acetic acid. My product is capable of forming quite clear solutions in chloroform or di-chlor-methane (with or without the addition of alcohol) or in acetic or formic acid.

I have also found that by treating the final tri-acetate product with a warm solution of a neutral salt has the effect of improving its stability.

For the purpose of giving those skilled in the art a better understanding of the invention, the following illustrative example will be given.

Example

Dry cellulose, e. g. cotton linters, is placed in a vessel that is resistant to the reaction liquids (acetic acid, acetic anhydride, sulfuric acid, benzene, etc., as hereinafter mentioned). In order that the reaction liquids may pass through the cellulose without disturbing the latter, the vessel is provided with one or more perforated plates or sieves or foraminous surfaces upon which the cellulose is supported.

The treatments can be carried out on suitable large bulks of cellulose, for example, several thousand kilograms. The treating liquid comprising a mixture of acetic acid of approximately 97.5% strength to which has been added a small quantity of catalyst, e. g. about 0.3% of sulphuric acid or compounds of perchloric acid, is first circulated through the cellulose by a pump or the like which may act continuously or intermittently. The duration of treatment and the temperature may be regulated to give any desired degree of degradation. For example, temperatures of about 10° C. to about 35° C. and periods of about 5 hours to about 36 hours may be used. The spent liquor comprising a mixture of acetic acid, residual catalyst and water is then withdrawn from the treated cellulose.

The liquid withdrawn may be supplied with a fresh quantity of catalyst and be used for treating a further bulk of cellulose. Alternatively the catalyst remaining in the withdrawn liquid may be precipitated, e. g. by the addition of barium acetate when sulfuric acid is used as a catalyst, and the clarified liquid be provided with fresh catalyst to render it suited to further use.

When this first stage of the treatment is completed, liquor still adhering to the fibrous mass of treated cellulose in the vessel is advantageously removed by passing through the mass while still in the vessel a suitable liquid, e. g. benzene. The addition liquid employed is advantageously a substance which, like benzene exerts a swelling but not a solvent action upon cellulose acetate. The addition liquid is advantageously used in a cold condition by being previously cooled to near its freezing point. By operating in this manner, a substantial separation of the treating agent from the treated cellulose is effected so that for example only about 15 to 20 per cent by weight of the liquor remains adhering to the treated cellulose. The treated cellulose is then further treated at low temperature with an excess of acetic anhydride in conjunction with a further quantity of an addition liquid (e. g. benzene) having no solvent action on the fibrous mass but adapted by its swelling action to enable the time of acetylation to be reduced.

After the mass has been protected to a certain extent from extensive decomposition by the entry of acetic acid radicals, the continuation of the treatment can be carried out at a higher temperature, not however exceeding about 30° C. The excess acetic anhydride remaining in the mass after the termination of the acetylation and also freshly formed acetic acid, and the small quantities of the originally applied acetic acid and of benzene, are drawn off and put to recovery or to re-use. Any liquid still adhering to the fibrous cellulose triacetate product is thoroughly separated by washing with benzene, and the wash liquor (containing benzene, acetic anhydride and acetic acid) is treated in any suitable recovery apparatus. The washed cellulose triacetate is then further treated first with cold water and then with warm water preferably by upward percolation to carry off any remaining benzene. Finally a short treatment is given with a warm neutral salt solution, e. g. a 2% solution of sodium sulphate, at 80° C., which enables a quite stable cellulose triacetate product to be produced which stands temperatures up to about 235° C. for about several hours without showing a change of colour that is deeper than yellow.

Although the present invention has been described in connection with a preferred procedure of carrying the invention into practice, it is to be understood that variations and modifications may be resorted to as those skilled in the art will readily understand. Such variations and modifications are considered to be within the purview and scope of the appended claims.

I claim:—

1. The production of highly acetylated cellulose acetates which comprises establishing a pile of cellulose upon a perforated base, circulating an excess of acetic acid containing a catalyst over said cellulose for first stage of treatment, washing the said treated cellulose with benzene to remove at least a portion of the circulated acid and circulating an acetylating liquid over said cellulose while maintaining said pile in a quiescent state.

2. The production of highly acetylated cellulose acetates which comprises establishing a pile of cellulose upon a perforated base, continuously circulating an excess of acetic acid containing a catalyst over said cellulose while maintaining said pile in a quiescent state, withdrawing the treating liquid from said mass of cellulose, passing benzene through the treated cellulose whereby only a small amount of treating liquid remains adhering to the treated mass, and circulating acetic anhydride and benzene through said mass to form fibrous tri-acetate of cellulose.

3. The production of high acetylated cellulose acetates which comprises establishing a pile of cellulose upon a perforated base, recirculating an excess of acetic acid containing a catalyst over said cellulose for the first stage of treatment, passing benzene over said treated cellulose to remove a major portion of said acetic acid and catalyst, circulating an acetylating liquid for the second stage while maintaining said pile in a quiescent state, continuing the treatment with acetylating liquid until triacetate is formed, and washing said triacetate with a warm solution of sodium sulphate.

4. The production of highly acetylated cellulose acetates which comprises circulating an excess of acetic acid containing a catalyst over a mass of cellulose in a quiescent state, passing benzene over said treated cellulose to remove about 80% to about 85% of said acid therefrom, treating a mass of cellulose in a quiescent state with an excess of acetic anhydride containing a swelling agent to produce a highly acetylated cellulose product, and rendering said product quite stable by treatment with a warm solution of sodium sulphate.

5. The production of highly acetylated cellulose acetates which comprises circulating an excess of acetic acid over a mass of cellulose in a quiescent state, passing benzene over said treated cellulose to remove practically all of the acetic acid therefrom, treating a mass of cellulose in a quiescent state with an excess of acetic anhydride containing a swelling agent to produce a highly acetylated cellulose product, and rendering said product quite stable by treatment with a warm solution of a neutral salt, containing sodium sulphate and having a temperature of about 80° C.

ERNST BERL.